(12) United States Patent
Kudla et al.

(10) Patent No.: US 11,078,983 B2
(45) Date of Patent: Aug. 3, 2021

(54) COMPLIANT ELASTOMERIC SHOCK ABSORBING APPARATUS

(71) Applicant: ITT MANUFACTURING ENTERPRISES LLC, Wilmington, DE (US)

(72) Inventors: Christopher Kudla, Pendleton, NY (US); Jeffrey T. Kelly, Orchard Park, NY (US); Marshall W. Downing, Erie, PA (US); John T. Koscielniak, Blasdell, NY (US); Jeffrey N. Weisbeck, Orchard Park, NY (US); Gregory Herman, Hamburg, NY (US); James Senneff, Buffalo, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 16/196,408

(22) Filed: Nov. 20, 2018

(65) Prior Publication Data
US 2019/0085930 A1 Mar. 21, 2019

Related U.S. Application Data

(62) Division of application No. 15/005,419, filed on Jan. 25, 2016, now Pat. No. 10,145,443.
(Continued)

(51) Int. Cl.
*F16F 13/24* (2006.01)
*F16F 13/08* (2006.01)

(52) U.S. Cl.
CPC ............. *F16F 13/24* (2013.01); *F16F 13/08* (2013.01)

(58) Field of Classification Search
CPC .......... F16F 13/24; F16F 13/08; F16F 13/007; F16F 13/10; F16F 13/00; F16F 13/107; F16F 9/342; F16F 9/486
See application file for complete search history.

(56) References Cited

U.S. PATENT DOCUMENTS

| 3,758,095 A | 9/1973 | Mulhauser ................ F16F 1/32 267/165 |
| 3,938,840 A | 2/1976 | Haase et al. |

(Continued)

FOREIGN PATENT DOCUMENTS

| DE | 2414929 | 10/1975 | ............. F16F 13/00 |
| DE | 26 18 333 A1 | 11/1977 | |

(Continued)

OTHER PUBLICATIONS

European Examination Report for EP 16 705 868.4; dated Oct. 12, 2018; 6 pgs.
(Continued)

*Primary Examiner* — Xuan Lan Nguyen
(74) *Attorney, Agent, or Firm* — Barclay Damon LLP

(57) ABSTRACT

A shock absorbing apparatus includes a flexible membrane defining an accumulator cavity, and a compression assembly defining a compression cavity. The compression assembly is disposed within the flexible membrane such that viscous fluid contained within the cavities may be exchanged therebetween by a damping orifice, fluid conduit and or valve mechanism. The accumulator cavity deforms in response to the application of a transmitted impact load, and is capable of storing and releasing potential energy in response to the application and cessation of the transmitted impact load.

11 Claims, 9 Drawing Sheets

Related U.S. Application Data

(60) Provisional application No. 62/107,766, filed on Jan. 26, 2015.

(56) References Cited

U.S. PATENT DOCUMENTS

| | | | |
|---|---|---|---|
| 3,944,031 A | 3/1976 | Cholet | F16F 9/08 188/298 |
| 4,161,304 A | 7/1979 | Brenner et al. | |
| 4,199,128 A | 4/1980 | van den Boom et al. | |
| 4,383,679 A | 5/1983 | Kakimoto | |
| 4,437,653 A | 3/1984 | Kakimoto | |
| 4,483,521 A | 11/1984 | Kakimoto | |
| 4,573,656 A | 3/1986 | Yoshida et al. | |
| 4,588,173 A | 5/1986 | Gold et al. | |
| 4,595,183 A | 6/1986 | Dan et al. | |
| 4,618,128 A | 10/1986 | Härtel et al. | |
| 4,630,803 A | 12/1986 | Werner et al. | |
| 4,630,808 A | 12/1986 | Ushijima et al. | |
| 4,650,169 A | 3/1987 | Eberhard et al. | |
| 4,651,980 A | 3/1987 | Morita et al. | |
| 4,653,734 A | 3/1987 | Jördens | |
| 4,676,489 A | 6/1987 | Hofmann et al. | |
| 4,679,777 A | 7/1987 | Gold et al. | |
| 4,700,933 A | 10/1987 | Chikamori et al. | |
| 4,709,898 A | 12/1987 | Yoshida et al. | |
| 4,739,962 A | 4/1988 | Morita et al. | |
| 4,746,104 A | 5/1988 | Probst | |
| 4,753,422 A | 6/1988 | Thorn | |
| 4,762,309 A | 8/1988 | Hutchins | |
| 4,773,634 A | 9/1988 | Hamaekers | |
| 4,811,934 A | 3/1989 | Bebermeier et al. | |
| 4,826,126 A | 5/1989 | Katayama et al. | |
| 4,844,430 A * | 7/1989 | Miya | B60G 7/02 267/140.12 |
| 4,938,463 A | 7/1990 | Miyamoto | |
| 5,088,580 A | 2/1992 | Grothe et al. | |
| 5,139,241 A | 8/1992 | Hamaekers et al. | |
| 5,551,673 A | 9/1996 | Furusawa et al. | |
| 5,560,161 A | 10/1996 | Lou | |
| 5,630,573 A | 5/1997 | Suzuki et al. | |
| 5,657,510 A | 8/1997 | Satori et al. | |
| 5,730,429 A | 3/1998 | Ivers | F16F 1/3605 267/140.14 |
| 5,769,402 A | 6/1998 | Ide et al. | |
| 5,779,231 A | 7/1998 | Okazaki et al. | |
| 5,813,665 A | 9/1998 | Kanda | |
| 5,823,515 A | 10/1998 | Takehara et al. | |
| 5,848,782 A | 12/1998 | Hein et al. | |
| 5,897,092 A | 4/1999 | Mizutani et al. | |
| 5,979,883 A | 11/1999 | Mizutani et al. | |
| 6,102,380 A | 8/2000 | Tsutsumida | |
| 6,250,615 B1 | 6/2001 | Leibach | |
| 6,250,616 B1 | 6/2001 | Suzuki et al. | |
| 6,352,246 B2 | 3/2002 | Katagiri | |
| 6,422,545 B1 | 7/2002 | Baudendistel et al. | |
| 6,425,575 B1 | 7/2002 | Takashima et al. | |
| 6,435,487 B1 | 8/2002 | Takaoka et al. | |
| 6,527,261 B2 | 3/2003 | Breitfeld et al. | |
| 6,540,215 B2 | 4/2003 | Takaoka et al. | |
| 6,554,263 B2 | 4/2003 | Takashima et al. | |
| 6,598,864 B2 | 7/2003 | Freudenberg et al. | |
| 6,599,640 B2 | 7/2003 | Suzuki et al. | |
| 6,663,090 B2 | 12/2003 | Simuttis et al. | |
| 6,676,117 B2 | 1/2004 | Desmoulins et al. | |
| 7,007,934 B2 | 3/2006 | Goto et al. | |
| 7,070,030 B2 | 7/2006 | Etcheverry | |
| 7,178,794 B2 | 2/2007 | Runyon | |
| 7,232,118 B2 | 6/2007 | Maeno et al. | |
| 7,267,332 B2 | 9/2007 | Kato et al. | |
| 7,306,210 B2 | 12/2007 | Happou | F16F 13/105 267/140.13 |
| 7,396,003 B2 | 7/2008 | Hibi et al. | |
| 7,703,754 B2 | 4/2010 | Siemer et al. | |
| 7,971,397 B2 | 7/2011 | Georgakis | |
| 8,191,876 B2 | 6/2012 | Kanaya et al. | |
| 8,240,644 B2 | 8/2012 | Lemaire et al. | |
| 8,490,954 B2 | 7/2013 | Saito et al. | |
| 8,596,621 B2 | 12/2013 | Ogasawara et al. | |
| 8,794,606 B2 | 8/2014 | Kubo et al. | |
| 8,807,544 B2 | 8/2014 | Yamamoto et al. | |
| 2001/0004141 A1 | 6/2001 | Shimoda et al. | |
| 2002/0105123 A1 | 8/2002 | Monson | F16F 1/374 267/140.11 |
| 2004/0262830 A1 | 12/2004 | Maeno et al. | |
| 2006/0180964 A1 | 8/2006 | Siemer et al. | |
| 2006/0279029 A1 | 12/2006 | Souyri | F16F 13/28 267/140.12 |
| 2007/0057421 A1 | 3/2007 | Nanno et al. | |
| 2008/0029942 A1 | 2/2008 | Kern | F16F 13/101 267/140.13 |
| 2008/0093785 A1 | 4/2008 | Muramatsu | |
| 2009/0321202 A1 | 12/2009 | Hamada et al. | |
| 2012/0292838 A1 | 11/2012 | Yamamoto et al. | |
| 2013/0001843 A1 | 1/2013 | Kanaya | |
| 2013/0038006 A1 | 2/2013 | Saito et al. | |
| 2013/0069288 A1 | 3/2013 | Saito et al. | |
| 2013/0187317 A1 | 7/2013 | Naiki et al. | |
| 2014/0265074 A1 | 9/2014 | Goossens et al. | |
| 2014/0291905 A1 | 10/2014 | Kanaya et al. | |

FOREIGN PATENT DOCUMENTS

| | | | |
|---|---|---|---|
| DE | 297 24 898 U1 | 9/2005 | |
| EP | 0 038 062 B1 | 1/1985 | |
| EP | 0 098 331 B1 | 1/1986 | |
| EP | 0 209 682 A2 | 6/1986 | |
| EP | 0 058 408 B1 | 9/1986 | |
| EP | 0 068 395 B1 | 10/1986 | |
| EP | 0 137 477 B1 | 2/1988 | |
| EP | 0 132 404 B1 | 9/1988 | |
| EP | 0 150 824 B1 | 10/1988 | |
| EP | 0 119 796 B1 | 8/1989 | |
| EP | 0 142 943 B1 | 1/1990 | |
| EP | 0 396 909 B1 | 7/1993 | |
| EP | 0 346 060 B1 | 8/1993 | |
| EP | 0 622 562 B1 | 3/2000 | |
| EP | 1 249 635 A2 | 10/2002 | |
| EP | 0 809 040 B1 | 1/2003 | |
| EP | 1 306 576 B1 | 8/2005 | |
| EP | 1 083 362 B1 | 10/2005 | |
| EP | 1 193 416 B1 | 11/2005 | |
| EP | 1 820 922 A1 | 8/2007 | |
| EP | 1 160 483 B1 | 11/2007 | |
| EP | 2 141 039 A2 | 1/2010 | |
| EP | 1 691 017 B1 | 5/2010 | |
| EP | 2 336 595 A1 | 6/2011 | |
| EP | 2 386 464 A1 | 11/2011 | |
| EP | 2 420 697 A1 | 2/2012 | |
| FR | 2168680 A5 * | 8/1973 | F16F 9/342 |
| FR | 2 398 226 A1 | 2/1979 | |
| JP | 59183136 A * | 10/1984 | F16F 13/08 |
| WO | WO 2007/093180 A1 | 8/2007 | |
| WO | WO 2014/149749 A1 | 9/2014 | |

OTHER PUBLICATIONS

International Search Report and Written Opinion for PCT/US2016/014893; dated Jul. 13, 2016; 15 pgs.

European Examination Report for EP 16 705 868.4; dated May 20, 2019; 4 pages.

European Examination Report for EP 16 705 868.4; dated Jan. 28, 220; 4 pages.

European Examination Report for EP 16 705 868.4; dated Dec. 7, 2020; 6 pages.

* cited by examiner

COMPLIANT ELASTOMERIC SHOCK ABSORBING APPARATUS

CROSS-REFERENCE TO RELATED APPLICATIONS

This application is a divisional application of U.S. application Ser. No. 15/005,419, filed Jan. 25, 2016, which claims priority under relevant portions of 35 U.S.C. § 119 to U.S. Patent Application Ser. No. 62/107,766, filed Jan. 26, 2015. The entire contents of each application are herein incorporated by reference.

TECHNICAL FIELD

This application is generally directed to the field of energy absorption apparatus and more specifically to a shock absorbing apparatus that employs a highly flexible housing containing a quantity of hydraulic fluid. The housing is defined by at least one elastomeric membrane to limit forces transmitted to the surroundings of an attached structure, but without requiring dynamic hydraulic seals or separate spring biasing apparatus.

BACKGROUND

There are several types of apparatus that can be employed for industrial and structural uses in order to absorb energy, such as from a transmitted load. For example, high cycle blow molding apparatus employ mold or die halves which can "bounce" as a consequence of opening and closing the dies, i.e., principally the impact of closing the dies. Such bounce can produce defects in the molded product resulting in increased scrap, additional maintenance and increased downtime of the blow molding apparatus. Consequently, the throughput/efficiency of the blow molding apparatus is adversely impacted. To alleviate difficulties associated with the foregoing, conventional shock absorbers have been employed to convert the impact energy of the bounce as dissipated heat.

More specifically, these shock absorbers typically include at least one piston assembly, which is disposed within an enclosed cavity or housing, and coupled to the machine under load. In operation, a transmitted shock or impact load creates: (i) movement of the piston assembly, (ii) a change in pressure of a contained incompressible hydraulic fluid in the cavity, and (iii) flow through at least one orifice that results in conversion of the applied kinetic energy to heat. The force of the transmitted shock or impact load is reduced by the shock absorber, thereby lowering the transmitted load from other parts of the machine or other attached structure.

For proper operation, shock absorbers as described above require at least one dynamic seal interposed between the moving parts to prevent fluid leakage, and/or the ingestion of air into the hydraulic cavity of the housing. Inasmuch as blow molding or other apparatus routinely undergo a high number of cycles, it is common for the dynamic seals to fail prematurely, requiring costly repair and maintenance. Additionally, the replacement of either the hydraulic seals, or the entire shock absorber assembly, can adversely impact manufacturing schedules or other time-critical events for the purpose of repairing and/or replacing the affected assemblies. It will be appreciated that avoiding down-time for such high throughput machines is an ongoing and important goal.

It is, therefore, desirable to provide an effective and reliable shock absorbing apparatus which mitigates the need for dynamic seals and the failure modes associated therewith. Furthermore, it will be appreciated that there is a competing and prevalent need to reduce complexity, improve reliability, and lower associated costs of such high cycle, dynamic shock absorbing apparatus.

BRIEF DESCRIPTION

Therefore and according to one embodiment, a shock absorbing apparatus comprises a flexible membrane defining an accumulator cavity and a compression assembly defining a compression cavity. The compression assembly is disposed within the flexible membrane such that a viscous fluid may be exchanged between the accumulator and compression cavities via a fluid conduit, damping orifice and/or one or more valve mechanisms. The accumulator cavity deforms in response to the application of a transmitted impact load, and is capable of storing and releasing potential energy in response to the application and cessation of the transmitted impact load.

The compression assembly includes a stationary guide and a reciprocating piston slideably mounted to the stationary guide. The compression assembly is operative to: (i) develop a first pressure differential, in response to the application of the transmitted impact load, for displacing the viscous fluid through a damping orifice from the compression cavity to the accumulator cavity, and (ii) develop a second pressure differential to restore the viscous fluid to the compression cavity from the accumulator cavity.

In yet another embodiment, the compression assembly includes a stationary shock tube for slidably mounting a reciprocating piston to an internal wall surface of the shock tube. The reciprocating piston and stationary shock tube, furthermore, define the compression cavity wherein the piston is responsive to the application of the transmitted impact load. Furthermore, the reciprocating piston is displaced by the flexible membrane to move a quantity of viscous fluid through the damping orifice.

In a further embodiment, the compression assembly includes a stationary strut for slideably mounting a reciprocating piston to an external wall surface of the stationary strut. The reciprocating piston and stationary strut, furthermore, define the compression cavity wherein the piston is responsive to the application of the transmitted impact load. Additionally, the reciprocating piston is displaced by the flexible membrane to move a quantity of viscous fluid through the damping orifice.

According to another embodiment, a shock absorbing apparatus is provided comprising a flexible housing substantially formed from at least one fluid-impermeable elastomeric section and defining an interior. A plate disposed within the interior of the housing has at least one orifice, the plate creating adjacent chambers containing a hydraulic fluid that are fluidically connected by the at least one orifice. At least one mounting plate connects the housing to a structure or machine that is under load. Transmitted shock loads from the structure causes the elastomeric housing to be pressurized, as well as the contained hydraulic fluid, causing the pressurized fluid to move through the at least one orifice to provide energy dissipation through viscous damping.

In at least one version, the flexible housing can be defined by at least one elastomeric section bonded to at least one support plate. In at least one embodiment, a pair of housing portions are provided, each having at least one elastomeric section bonded to a mounting plate and a striker plate, respectively. In one version, a single orifice is defined in a center plate although this number can be suitably varied and sized to enable damping characteristics to be suitably tuned.

In another optional version, at least one shaped pin member can be provided to define a variable orifice diameter wherein the pin member can be defined by a tapered configuration that effectively reduces the flow area when the pin member is moved into the orifice while under load. In addition and according to at least one embodiment, at least one spring can be provided within the defined housing to provide an additional biasing force along with the restoring force provided by the flexible elastomeric housing and also to prevent a compressive set.

According to another embodiment, the herein described shock absorbing assembly can be configured to receive impact or shock loads at respective ends of the defined flexible interchangeable according to a housing, and in which a biasing spring can be provided in each fluidic chamber in the housing interior such that the adjacent fluid chamber and accumulation chambers are symmetric.

According to another aspect, there is provided a method for manufacturing a shock absorbing apparatus without requiring sliding hydraulic seals, the method comprising: (i) bonding outer ends of a first elastomeric section to a mounting plate to create a first housing section; (ii) bonding outer ends of a second elastomeric section to a mounting plate to create a second housing section; and (iii) mounting a plate between the first and second housing sections, the plate having at least one orifice; (iv) connecting the two housing sections together to form an enclosed flexible housing, the orifice plate being sandwiched between the mounting plates and extending through the defined housing; (v) adding hydraulic fluid to the interior of the defined housing; and (vi) attaching each of the mounting plates of the housing to a structure under load, wherein impact loads to the housing cause a pressure differential between the defined fluid chambers, to further cause movement of the contained hydraulic fluid between defined fluidic chambers through the at least one orifice in order to effect damping and a restoring spring.

In one version, the fluidic chambers can be defined using a fixed plate that is disposed within the interior of the flexible housing, in which the fixed plate further includes the at least one orifice. One or more orifice holes can be sized and configured for a desired damping level when fluid is caused to pass therethrough.

Each end of the defined housing, in at least one version, can include at least one striker or contact plate that is axially aligned at an end of the flexible housing with the defined orifice that is configured to effect damping in response to an applied load.

At least one pin member can also be optionally added to the interior of the housing, the pin member having a tapered configuration that can be translated axially into and out of the orifice based on loading conditions, and thereby creating a variable orifice diameter. For example and according to one version, the pin member is assembled using fasteners to the striker plate and reduces the effective flow area when moved into the orifice. In at least one version, a pair of tapered pin members can be provided, each of these members being axially and symmetrically aligned with one another.

In addition, at least one spring can also be optionally included within the interior of the housing and more specifically within each of the defined fluidic chambers in order to additionally provide a biasing or restoring force along with the elastomeric material of the housing and/or to prevent compression of the herein described apparatus.

According to at least one other aspect, there is provided a shock absorbing apparatus comprising a flexible housing having an interior, a first housing portion including a fluid impermeable elastomeric section having outer ends bonded to a first base plate and a first striker plate; and a second housing portion including a fluid impermeable elastomeric section having outer ends bonded to a second base plate and a second striker plate. The apparatus further comprises a plate disposed between the first and second housing sections, the plate having at least one orifice, the plate defining adjacent interior fluidic chambers fluidically connected by the orifice that contain a hydraulic fluid, wherein impact loads to a striker plate causes pressurization and movement of the contained hydraulic fluid between defined fluidic chambers through the at least one orifice in order to effect shock absorption relative to a connected structure.

Advantageously, the herein described shock absorbing apparatus is simpler and easier to assemble than prior known versions based on a fewer number of required parts. The herein described shock absorbing apparatus performs reliably, but without requiring reciprocating piston assemblies and associated hydraulic sliding seals. As a result, the herein described apparatus has a longer overall service life as compared to prior designs, and particularly in working environments that are usually characterized by frequent or high loading cycles.

In addition, the herein described apparatus is relatively easy and inexpensive to manufacture as compared to prior art versions. For example, aspects of the housing can be injection molded according to at least one version. In addition, the herein described apparatus is simple in terms of assembly and also for purposes of mounting to a specified structure or machine that is under load for purposes of shock absorption.

For manufacturing purposes, the same mold can be used with various durometer/hardness properties of elastomer to provide stiffness variation. Similarly, different orifice sizes can utilize the same plate "blank". This allows the same components and manufacturing process/tools to be used for multiple applications of the herein described apparatus.

BRIEF DESCRIPTION OF THE DRAWINGS

Some of the embodiments will be described in detail, with reference to the following figures, wherein like designations denote like members.

DETAILED DESCRIPTION

The following relates to certain embodiments of a shock absorbing apparatus that relies upon at least one elastomeric element or membrane to define a highly flexible housing containing a hydraulic fluid that can be attached to a structure or machine under load. The apparatus reliably reduces transmitted shock loads from other parts of a machine or other structure. In one embodiment, a reciprocating piston or piston assembly is eliminated along with the requirement for dynamic seals. In other embodiments, a compression assembly is fully immersed within, or enveloped by, a flexible membrane or housing. In these embodiments, immersion of the compression assembly allows for a degree of fluid leakage or passage from one cavity to an adjacent cavity.

In certain embodiments, the shock absorbing apparatus reduces transmitted shock loads without the requirement for sliding dynamic seals to move a hydraulic fluid through a damping orifice and/or separate spring biasing elements to return the elastomeric membrane to its original shape/configuration for subsequent work cycles. As such, the hydraulic shock absorbing apparatus of the present disclosure is particularly advantageous for use in environments characterized by high cyclic loading such as, for example, blow molding apparatus for fabricating plastic containers/bottles. It will also be readily apparent that the shock absorbing apparatus described herein can be employed for nearly any application that requires impact and/or shock load absorption.

Figure 1:
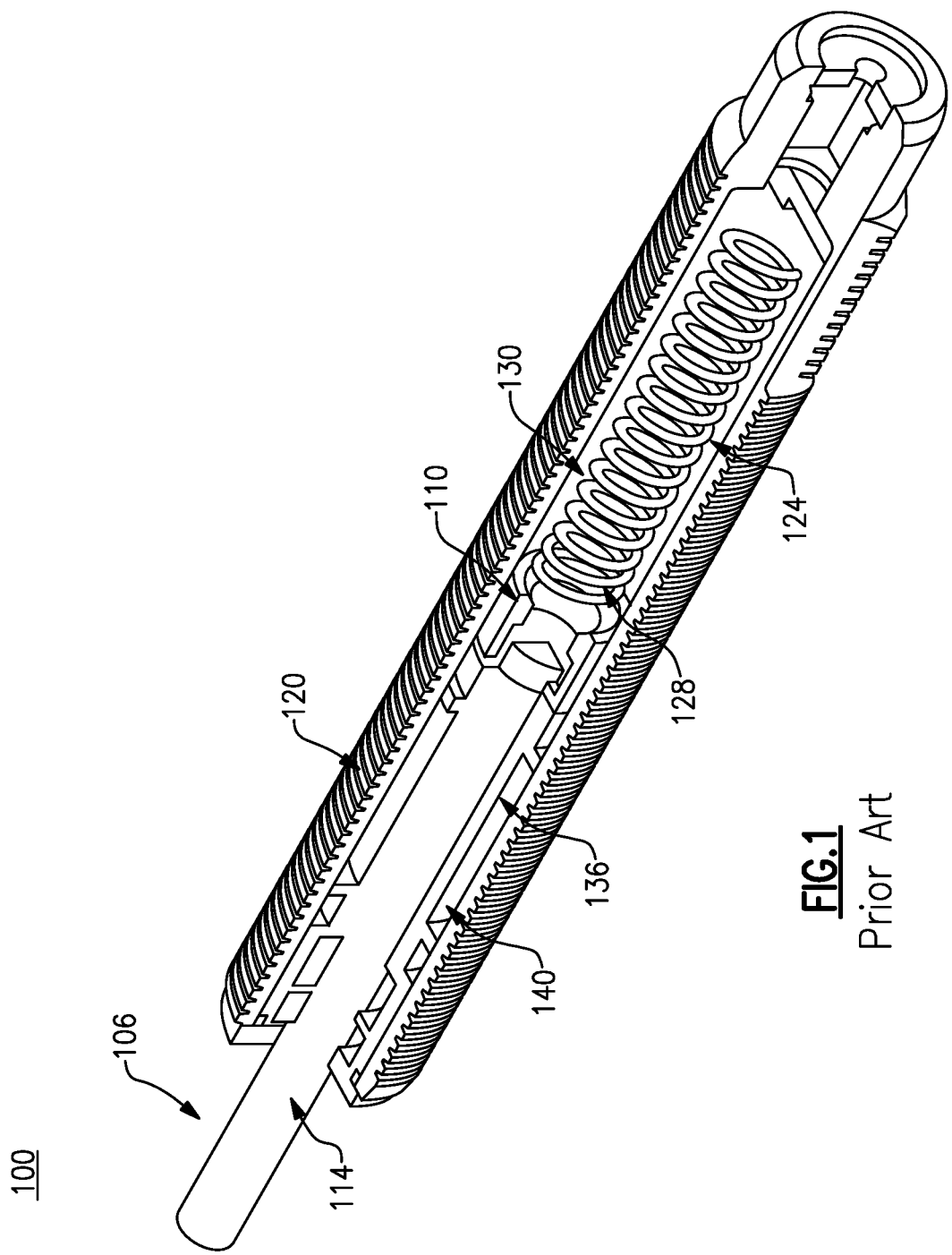
FIG. 1 is a sectioned view of a prior art shock absorbing apparatus.

For background purposes, reference is made to FIG. 1 which depicts a typical shock absorbing apparatus 100 comprising a piston assembly 106 disposed within, and supported by, a cylinder 120 containing a hydraulic damping fluid 108. More specifically, the piston assembly 106 includes a piston head 110, at one end, disposed within, and acting against, the hydraulic damping fluid of the hydraulic cylinder 120, and a cylindrical piston rod 114, at an opposing end, connected to the piston head 110.

In operation, the piston assembly 106 moves with, and is responsive to, a transmitted impact or shock load of the blow molding apparatus while the cylinder 120 is attached to a fixed support, or another portion, of a machine. More specifically, the transmitted shock or impact load causes axial movement of the piston assembly 106, including the piston head 110 against the hydraulic fluid, pressurizing same and causing movement of the fluid though at least one defined orifice 130 to an accumulator 136. This movement results in a reduction in transmitted force to the remainder of the connected structure as the energy of the shock load is dissipated over the stroke of the unit, i.e., as heat generated by the shearing action of the hydraulic fluid. The piston assembly 106 is configured to move axially in a reciprocating fashion in response to the transmission and cessation of load while a biasing coil spring 128 stores a portion of the kinetic energy of the piston assembly 106 as potential energy in the coil spring 128. With each cycle, the impact load displaces the piston head 110 so as to force the damping fluid through the damping orifice 130 in the piston head 110. With the cessation of the impact load, the coil spring 128 is operative to return the piston assembly 106 of the shock absorbing apparatus 100 to its initial or original position. To prevent leakage of the contained pressurized hydraulic fluid during movement of the piston head 110, a dynamic (frictional) seal 140 is provided. Under conditions typified by high cyclic loading, this dynamic seal 140 is prone to failure. Consequently, shock absorbing apparatus of the prior art require frequent replacement which adversely impacts throughput and machine efficiency.

Figure 2:
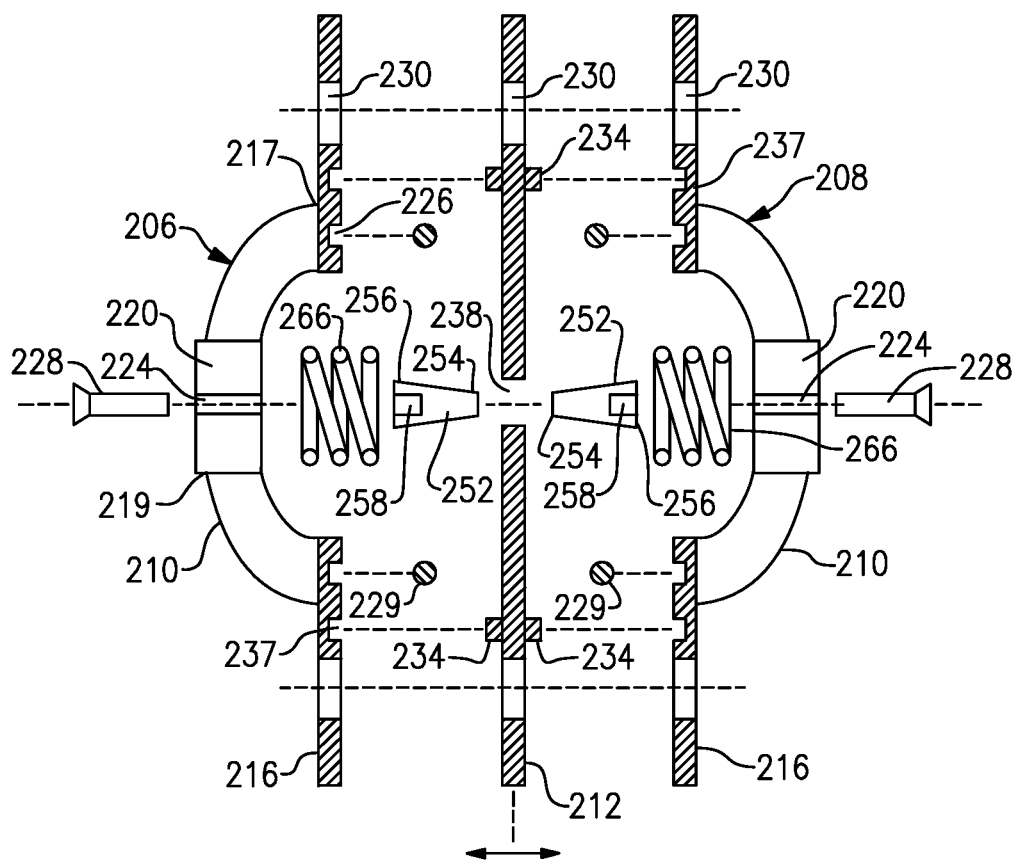
FIG. 2 is an exploded assembly view, shown partly in section, of a shock absorbing apparatus made in accordance with an exemplary embodiment.
Figure 3:
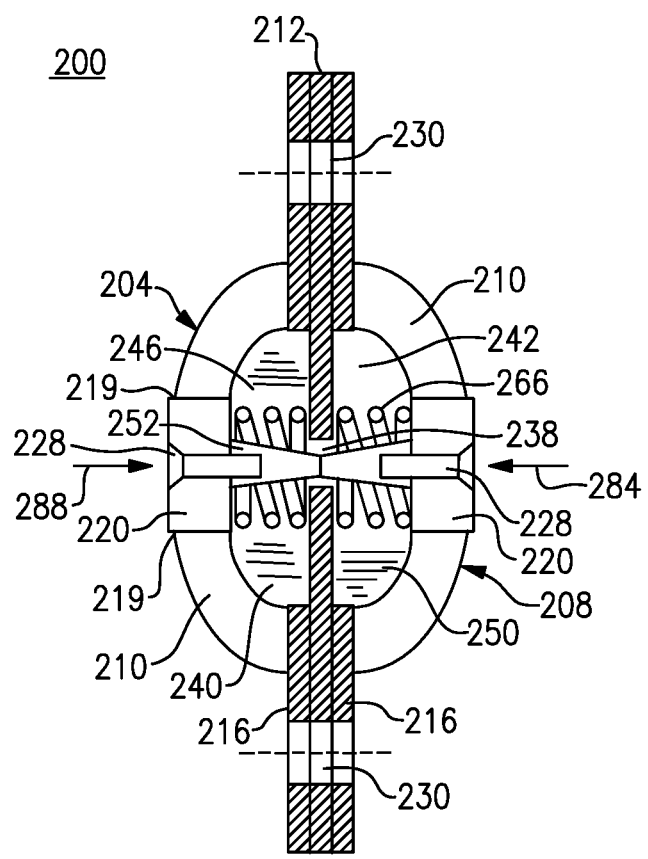
FIG. 3 is a sectioned view of the shock absorbing apparatus of FIG. 2.

Referring to FIGS. 2 and 3, a shock absorbing apparatus 200 in accordance with an exemplary embodiment is defined by a flexible housing 204 that is made substantially from a fluid-impermeable elastomeric material. According to this specific embodiment, the shock absorbing apparatus 200 is defined by a pair of housing portions 206, 208, as well as an orifice plate 212. Each of the housing portions 206, 208 are commonly defined by a section 210 of an elastomeric material of suitable shape, in this instance circular, and in which each elastomeric section 210 has an outer periphery 217 that is bonded to the inner peripheral edge of a mounting plate 216. It will be understood that the shape assumed for the mounting plates 216 and elastomeric sections 210 is exemplary and other configurations could be contemplated.

An inner periphery 219 of each elastomeric section 210 is further bonded to a striker plate 220. When assembled, each of the bonded elastomeric sections 210 of the housing portions 206, 208 form a complementary and substantially C-shaped configuration in which the mounting plates 216 each extend radially from the elastomeric section 210 and in which the striker plate 220 forms the center of each outwardly bowed housing portion 206, 208. In this embodiment, each of the housing portions 206, 208, including the elastomeric material section 210, are identical. It should be noted, however, that each housing portion 206, 208 could be configured with different material characteristics. For example, the thickness, shape and or material of the elastomeric sections of the first and second housing portions 206, 208 can be varied from one another in order to produce different responses under load. In the described embodiment, the flexible elastomeric sections may be fabricated from a rubber material, including natural rubber, fluoroelastomer, fluorosilione, silicone, EPDM, butyl rubber, nitrile rubber and the like. The flexible elastomeric material employed therein may have a shear modulus greater than about $4.35 \times 10^5$ psi, a bulk modulus greater than about $2.2 \times 10^5$ psi, a maximum elongation greater than about 100% from an original size/length, and a durometer of between about between about thirty (30) to about seventy (70) on a Shore A hardness scale.

Each mounting or support plate 216 according to this embodiment is formed as a substantially planar section made from a suitable metal, plastic or elastomeric material, provided each of the plates can provide structural support. In at least one version, each of the mounting plates 216 could also be made from an injection molded plastic. The mounting plates 216 are defined by an inner peripheral end and an opposing outer peripheral end with a circular opening being formed at the center of each mounting plate 216 which is bounded by the inner peripheral edge of the mounting plate 216. An annular groove 226 is formed on an opposing surface of each mounting plate 216 at the peripheral inner end relative to the bonded elastomeric section 210. The bonding of the elastomeric sections 210 to the striker and base plates 216, 220 can utilize adhesives, activated during the molding process, or as a post-molding standalone agent that creates or otherwise creates a durable fluid-tight seal. According to this embodiment, the annular groove 226 of each housing portion 206, 208 is configured to receive an O-ring 229 or other form of static sealing member.

The striker plates 220 are made from a durable material, such as a thermoset wear-resistant plastic and are commonly defined by a substantially cylindrical configuration. Each striker plate 220 is sized to substantially correspond with the thickness of the solid elastomeric section 210 and includes a center through opening 224 sized to receive a fastener 228, such as a counter sunk fastener, the fastener 228 having a length that extends into the interior 240 of the housing 204 when attached, as shown in FIG. 3. Each of the two mounting plates 216 and the sandwiched orifice plate 212 are defined by an aligned series of mounting holes 230 which are exterior to the formed flexible housing 204. The mounting holes 230 enable attachment of the flexible housing 204 to a structure or machine (not shown) using fasteners (not shown). It should be noted that this embodiment depicts striker or impact plates 220 as part of each housing portion 206, 208. Alternatively, only one of the housing portions can be provided with a striker or impact plate 220.

The orifice plate 212 according to this exemplary embodiment is defined by a planar member made from plastic, metal, composite or other durable material that is sized and configured to extend through the interior of the defined housing 204 with the outer end of the orifice plate 212 being sized to complement the mounting plates 216, including the mounting holes 230. At least one orifice 238 formed at substantially the center of the orifice plate 212 is axially aligned according to this embodiment with the through openings 224 of the striker plates 220, when assembled. The orifice plate 212 divides the hollow interior 240 of the housing 204 into adjacent substantially hemispherical chambers 242, 246 that are fluidically interconnected by the defined orifice 238. In the context used herein, "fluidically" means a fluid connection, or the type of connection, between two portions, cavities or chambers of the hydraulic shock absorbing apparatus, i.e., that the cavities are in fluid communication. Though only a single orifice 238 is provided according to this embodiment, one or more orifice(s) can be suitably provided and sized in order to effectively tune the amount of damping required. According to this embodiment, the orifice plate 212 further includes a pair of outwardly extending annular rings 234 radially exterior to the housing 204 that are sized and configured to fit within corresponding grooves 237 which are formed within the inner facing side of a corresponding mounting plate 216 to further retain the assembly 200 in a press fit. Following the above described press fit assembly of the housing portions 206, 208, a quantity of hydraulic fluid 250 can be added to the hollow interior 240 of the housing 204. According to this embodiment, the hydraulic fluid 250 can be added to the through opening 224 formed in one of the striker plates 220, forming a sealable fill port, and prior to attaching the fastener 228.

According to this specific embodiment and still referring to FIGS. 2 and 3, at least one pin member 252 can be optionally disposed within the hollow interior 240 of the defined housing 204. More specifically and according to this exemplary embodiment, a pair of hollow pin members 252 can optionally be provided, each pin member 252 having a conical tapered configuration defined by a distal end opening 254 having a first diameter and a proximal end opening 256 having a second diameter that is larger than the first diameter. According to this exemplary embodiment, the pin members 252 each include a proximal opening 258, FIG. 2, that receives the extending end of fasteners 228 at each end of the housing 204. When positioned in the manner shown in FIG. 3, the application of a transmitted axial load 284 to the housing 204 will cause the pin members 252 to be moved into the orifice 238, thereby reducing the effective flow area and creating a variable orifice diameter.

In addition, a pair of springs 266 can be optionally provided in the hollow interior 240 and aligned with the orifice 238 and the striker plates 220 in order to provide a biasing or restoring force in addition to that of the elastomeric housing 204. In this embodiment, each of the springs 266 are mounted between the striker plate 220 and the orifice plate 212 in each respective fluidic chamber 242, 246 with the pin member 252 extending through the center of the spring 266. According to this specific embodiment and when assembled, the springs 266 are axially aligned with the orifice 238, as well as the center openings 224 of each striker plate 220 and with the spring ends being in engagement between a striker plate 220 and the orifice plate 212 in each defined fluidic chamber 242, 246.

Fasteners (not shown) from a machine or other structure, such as threaded or other forms of fasteners, secure the herein described optional assembly through the aligned openings 230 of the mounting plates 216 and the sandwiched orifice plate 212, thereby fixedly attaching the assembly to a structural component.

In operation and still referring to FIGS. 2 and 3, the herein described shock absorbing apparatus 200 can be disposed between respective die portions of a blow molding machine (not shown) and mounted using fasteners attached through the aligned holes 230 of the mounting plates 216 and the orifice plate 212. As attached, one of the striker plates 220 is aligned in relation to the movable die portion (not shown) of the machine. As the die is closed, the die engages the striker plate 220 as depicted by arrow 284, generating a compressive load against the flexible elastomeric housing 204 and more specifically the elastomeric section 210 of the housing 204. This causes an inward deformation of the flexible housing 204, resulting in the hydraulic fluid 250 contained in the first fluidic chamber 242 to be pressurized and forced through the orifice 238 and into the adjacent second fluidic chamber 246 with the optional tapered pin member 252 also being advanced into the orifice 238 based on the application of load.

The shearing of the contained fluid 250 through the orifice hole(s) and the flexion of the herein described elastomeric housing 204 acts to convert the energy of the applied load from the machine into heat that is dissipated to the environment. Following the application of load, the elastomeric nature of the housing 204 provides a restoring force to revert the housing 204 to its original shape in the direction of arrow 288, with the hydraulic fluid 250 being restored to the fluidic chamber 242 and under the additional biasing force of the optionally provided springs 266.

Figure 4:
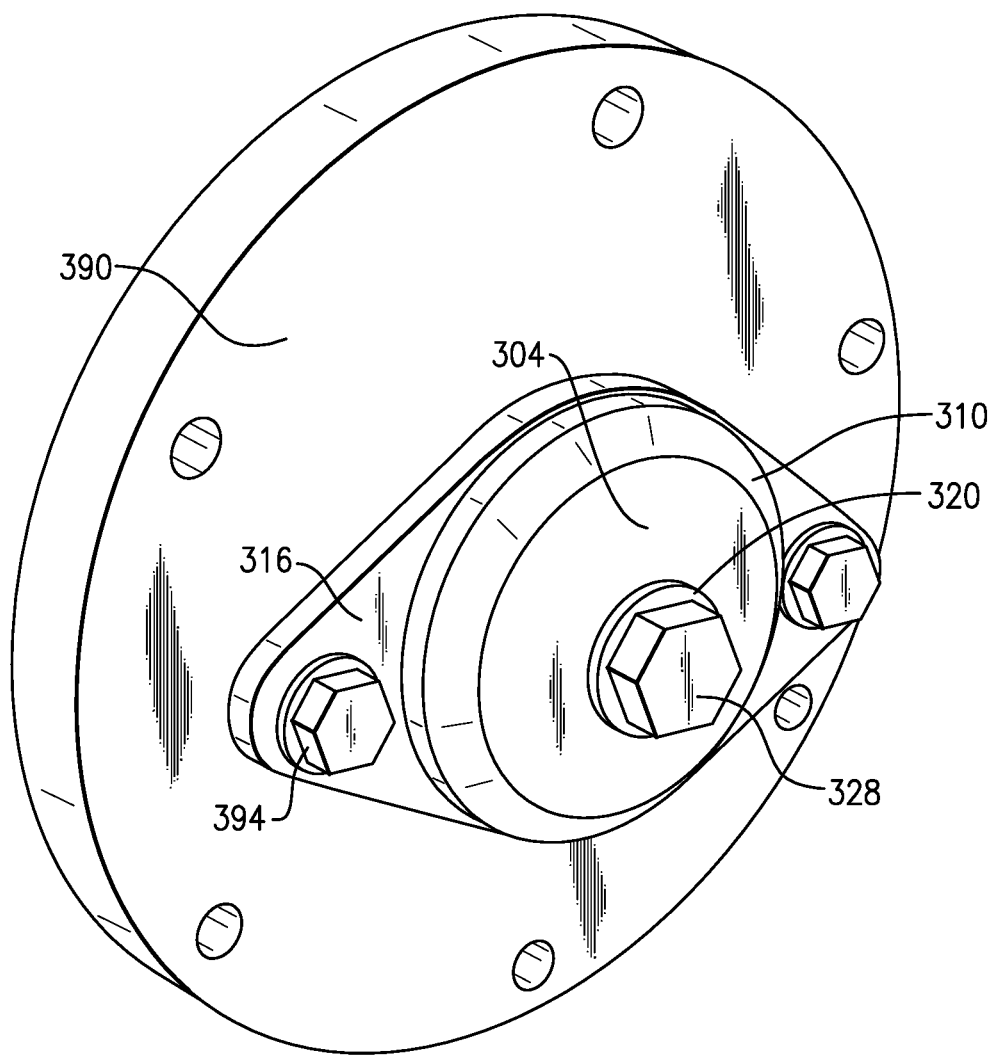
FIG. 4 is a perspective view of a shock absorbing apparatus in accordance with another exemplary embodiment attached to a testing structure.
Figure 5:
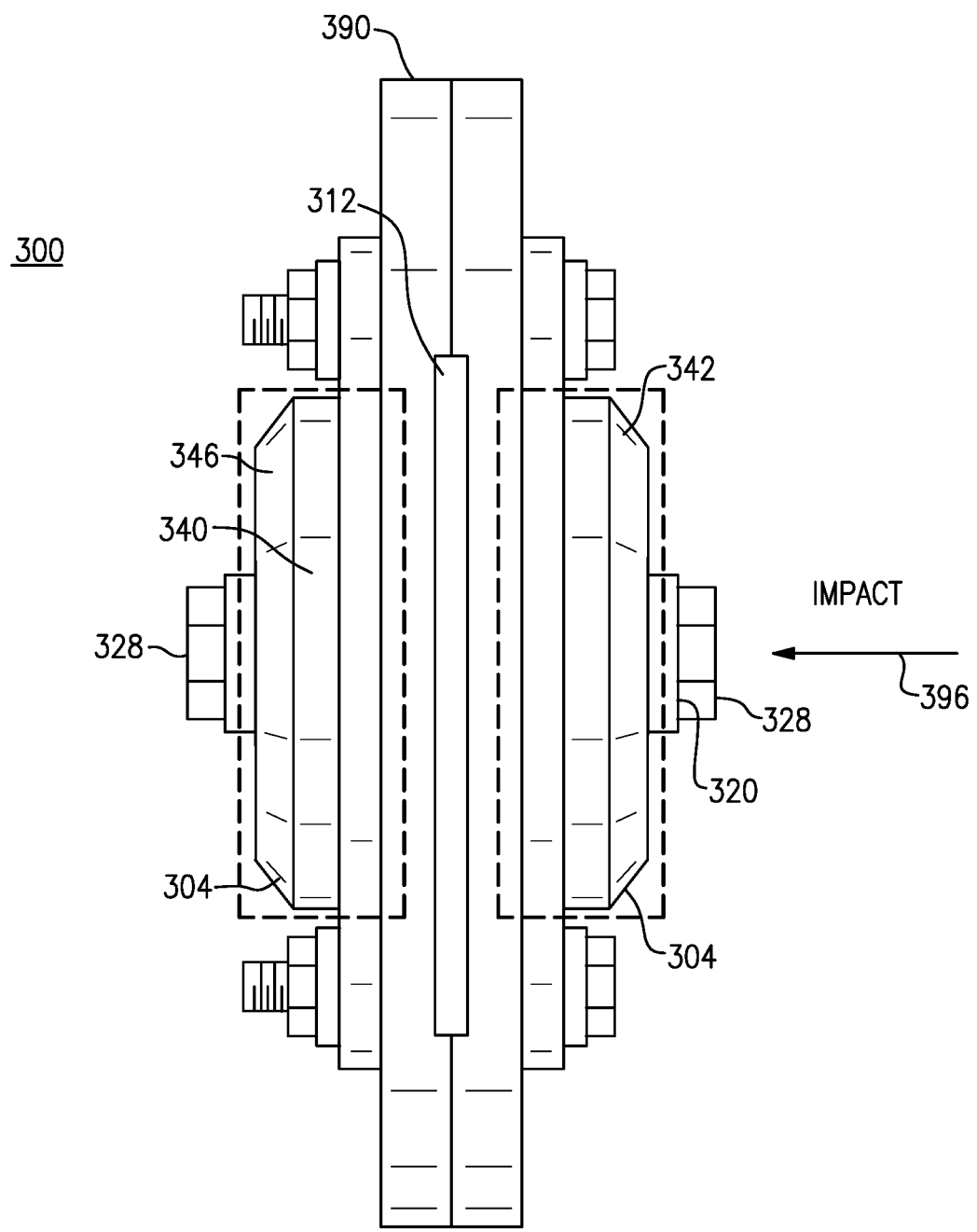
FIG. 5 is a side elevation view of the shock absorbing apparatus of FIG. 4.

Another version of the herein described shock absorbing apparatus is illustrated in FIGS. 4 and 5, and as used in conjunction with a testing structure 390, partially shown). According to this specific embodiment, the shock absorbing apparatus 300 is defined by a flexible housing 304 that is made from a pair of housing portions that are fastened together and sealed. Each of the housing portions, similar to the preceding embodiment, include the elastomeric section 310 that is attached, such as by bonding or other suitable means, to a mounting or support plate 316 and a striker plate 320, respectively, the latter having a fastener 328 extending into the interior of the housing 304. The latter mounting plates 316 are attached to one another using fasteners 394 or the like to opposing sides of the testing structure 390.

According to this embodiment, the mounting plates 316 are made from a metallic material having a bonded elastomeric material such as silicone, though other suitable materials could be utilized that provide structural integrity, flexibility as well as being fluidically impermeable. In the described embodiment, the flexible elastomeric material may be fabricated from a rubber material, including natural rubber, fluoroelastomer, fluorosilione, silicone, EPDM, butyl rubber, nitrite and the like. The flexible elastomeric material may have a shear modulus greater than about $4.35 \times 10^5$ psi, a bulk modulus greater than about $2.2 \times 10^5$ psi, a maximum elongation greater than about 100% from an original size/length, and a durometer of between about thirty (30) to about seventy (70) on a Shore A hardness scale.

A pair of adjacent fluidic chambers 342, 346 (shown in phantom in FIG. 5) are defined within a hollow interior of the herein described damping apparatus 300 and into which a quantity of hydraulic fluid is added, such as through an opening in the striker plate 320 formed at one end of the defined housing 304. The adjacent fluidic chambers 342, 346 are separated from one another and fluidically connected by a fixed orifice plate 312, disposed within the interior of the housing 304, the latter of which having at least one defined orifice or through opening (not shown) and in which the orifice plate 312 is also secured using fasteners or other suitable means to the mounting plates 316 in a clamped configuration.

In operation, the shock absorbing apparatus 300 is attached to the testing fixture 390 using fasteners 394 secured through openings formed in the mounting and support plates 316. Hydraulic fluid is added to the hollow interior of the housing 304 through the fill port at the end of the housing 304 in which a plug such as the fastener 328 secures the port after filling. When acted upon by an axial load directed against the striker plate 320, the highly flexible housing 304 and more specifically the elastomeric material 310 of the housing 304 is caused to deform inwardly, which decreases the internal volume of the housing 304 and more specifically chamber 342. This reduction causes contained hydraulic fluid to also be pressurized and forced into the confines of the adjacent fluidic chamber through the defined orifice in order to provide shock absorption.

Figure 6:
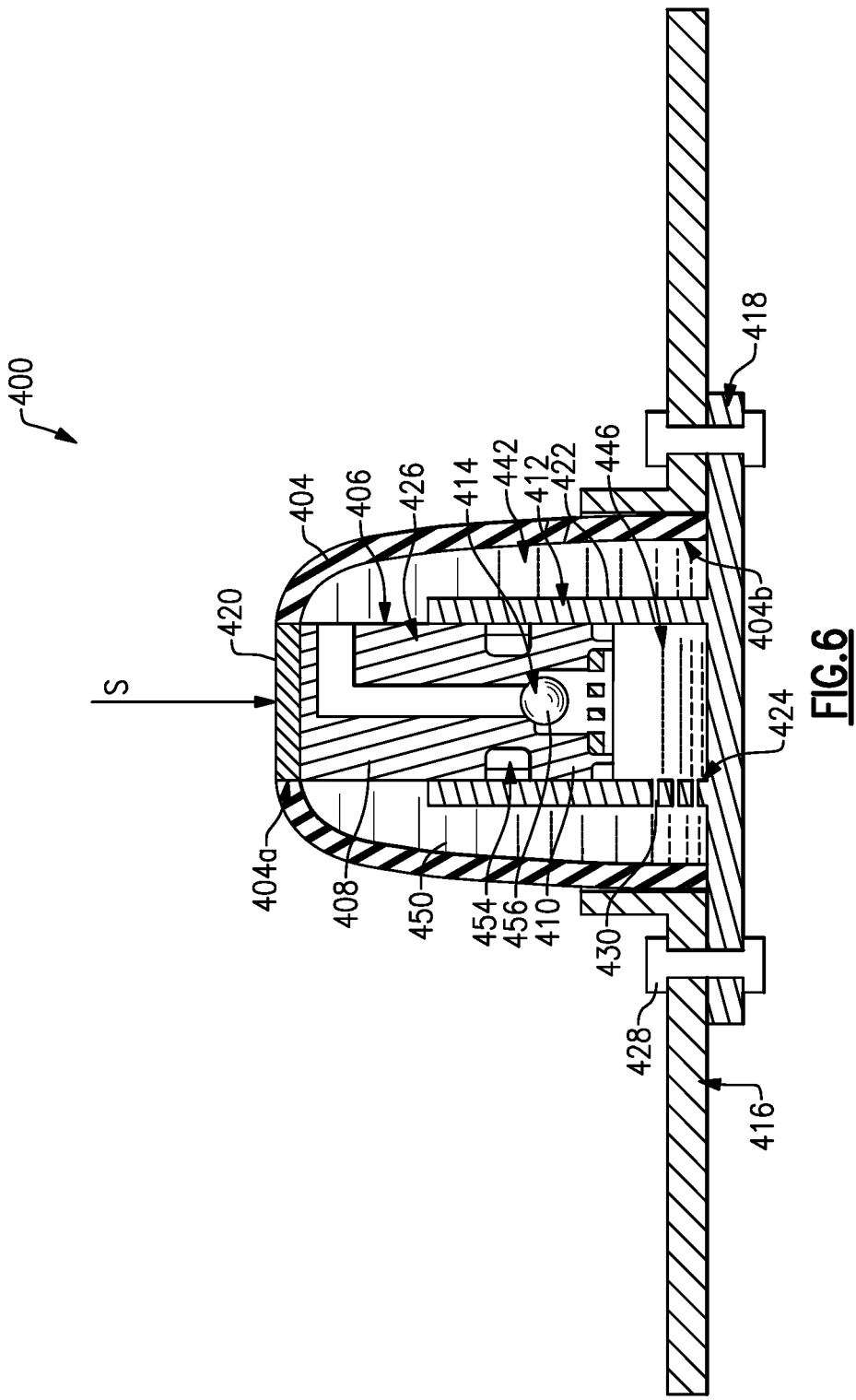
FIG. 6 is a sectioned view of a shock absorbing apparatus in accordance with another embodiment wherein a base plate of the shock absorbing apparatus is riveted to a mounting plate.
Figure 7:
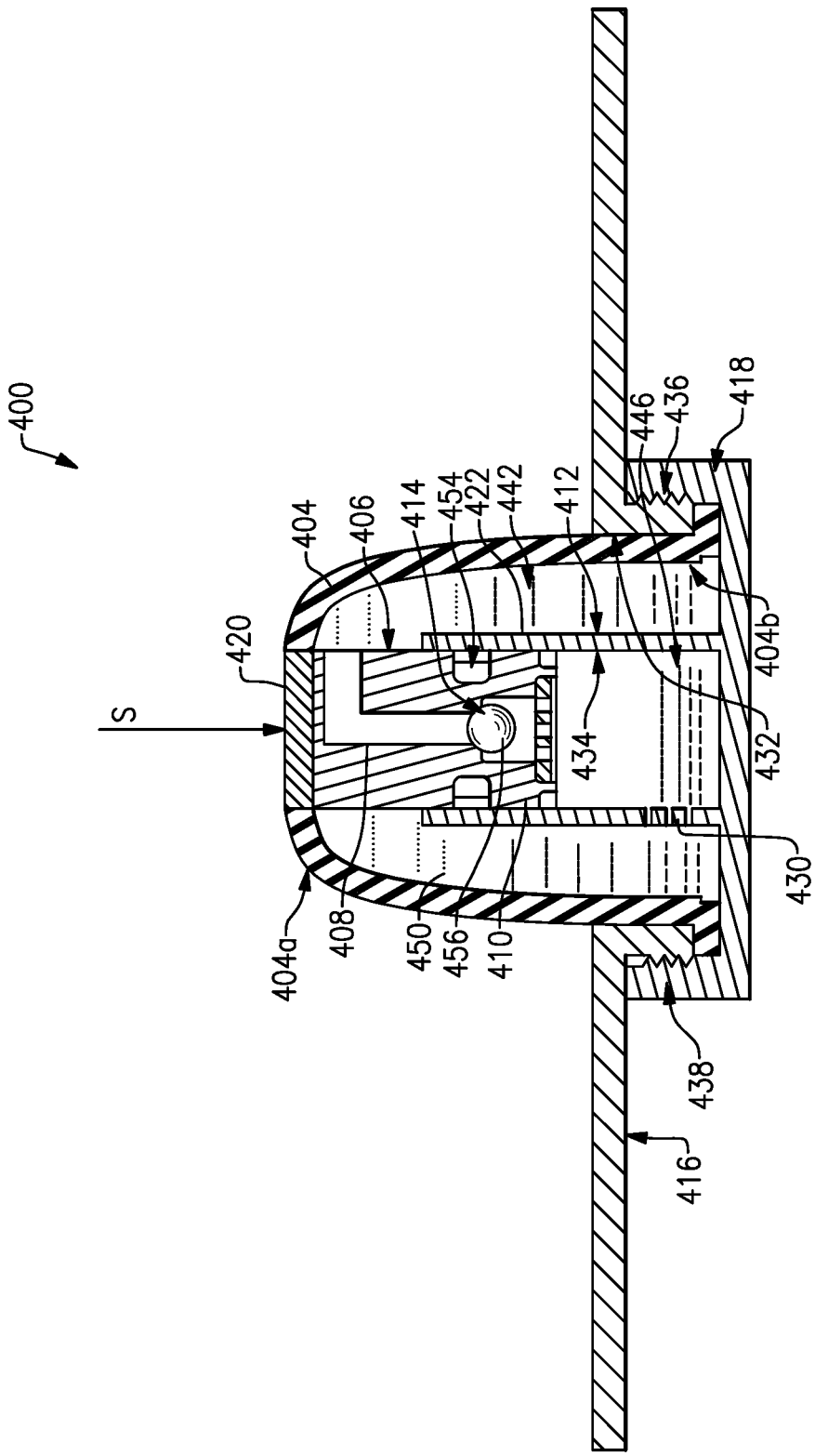
FIG. 7 is a sectioned view of a shock absorbing apparatus in accordance with another embodiment wherein a base plate is threadably mounted to the mounting plate.

Referring to FIGS. 6 and 7, a shock absorbing apparatus 400 in accordance with another embodiment comprises: (i) a flexible elastomeric element or membrane 404 defining a compliant accumulator cavity 442 which deforms in response to the application or cessation of a transmitted impact load S, and (ii) a compression assembly 406 defining a rigid, compression cavity 446 operative to move or displace a contained viscous fluid 450 through at least one damping orifice 430 from the compression cavity 446 to the compliant accumulator cavity 442. In the described embodiment, the compression assembly 406 is at least partially enveloped or enclosed by the flexible elastomeric membrane 404 such that viscous fluid contained within each of the compliant accumulator or rigid compression cavities 442, 446 may be exchanged. More specifically, the compression assembly 406 is operative to create a first pressure differential by which: (i) a first pressure is developed in the compression cavity 446, in response to the application of the transmitted impact load S, and (ii) a second pressure, lower than the first pressure, is developed in the compliant accumulator cavity 442. This pressure differential causes displacement of a quantity of viscous fluid 450 through the damping orifice 430 from the compression cavity 446 to the compliant accumulator cavity 442, while elastically deflecting or deforming the flexible elastomeric element or membrane 404. Upon cessation of the impact load S, the first pressure within the compression cavity 446 reduces to zero and a second pressure differential is then created in which a quantity of contained viscous fluid 450 is then displaced from the compliant accumulator cavity 442 through a conduit 408 and the damping orifice 430 to the compression cavity 446. This latter movement of fluid restores the compression cavity 406 to its fully extended state.

In the embodiment depicted in FIG. 6, the compression assembly 406 may include: (i) a reciprocating input member or piston 410, (ii) a stationary piston guide 412, and (iii) a valve mechanism 414 disposed in combination with the reciprocating input member 410 and operative to refill or restore a quantity of the viscous fluid 450 from the accumulator cavity 442 to the compression cavity 446. With respect to the latter, the valve mechanism 414 prepares or readies the compression assembly 406 for a subsequent work cycle by allowing the fluid to flow through a conduit 408 which fluidically connects the cavities 442, 446. The cooperation between the various elements will be further discussed in greater detail.

The flexible elastomeric element or membrane 404 is positioned beneath the transmitted impact load S such that the elastomeric membrane 404 is displaced or deformed in one direction as a consequence of the application of the impact load S. Furthermore, as will be discussed in greater detail hereinafter, the flexible elastomeric membrane 404 stores at least a portion of the transmitted impact load S, such that in the absence of the impact load S, the flexible elastomeric membrane 404 returns to its original size and/or shape so as to be readied for the next work cycle. That is, the flexible elastomeric membrane 404 stores a portion of the energy required to displace the flexible membrane 404 as potential energy in the elastomeric material. The stored energy, which is principally stored as tension in the elastomeric material (i.e., similar to the way a balloon expands to store the energy as compressed air/potential energy in the high elongation rubber) may be released when the transmitted impact load S either changes direction or is periodically released with each cycle.

In the described embodiment, the elastomeric membrane 404 may be sealed, at one end, to a mounting plate 416 and, at another end, to an impact plate 420. In the described embodiment, the impact plate 420 may be integrated with the flexible elastomeric membrane 404 such that it may transmit shock loads S from a blow molding apparatus (not shown) or other transmission source. The seals at the first and second ends 404a, 404b of the flexible elastomeric membrane 404, may be permanently bonded, fused, or molded in combination with the mounting plate 416 and/or with the impact plate 420. When bonding the flexible elastomeric membrane 404 to the mounting or impact plates 416, 420, a conventional adhesive may be used, either activated during the molding process, or as a post-molded sealing agent that creates or otherwise forms a durable fluid-tight seal. Alternatively, the flexible elastomeric membrane 404 may be stretched over an edge, annular lip or groove of the mounting or impact plates 416, 420 and captured by an annular compression/sealing ring (not shown). Alternatively still, the impact plate 420 may be integrated with the compression assembly 406, i.e., the upper portion of the reciprocating piston 410, or simply bonded over an external surface of the flexible elastomeric membrane 404. With respect to the latter, the compression assembly 406 may be disposed beneath and aligned with the impact plate 420 such that the flexible membrane 404 is sandwiched between the impact plate 420 and the compression assembly 406.

In the described embodiment, the flexible elastomeric membrane 404 defines a selectively-shaped compliant vessel, e.g., cup, bell, or dome-shaped, which produces a desired spring rate stiffness. It will be appreciated that the stiffness of the flexible elastomeric membrane 404 will be a function of various factors, including, inter alia, the wall thickness of the elastomeric membrane 404, the shear and bulk modulus of the elastomeric material, and the durometer and/or elongation properties. These and other properties determine the ability of the flexible elastomeric membrane 404 to: (i) react transmitted shock loads S acting on the striker plate 420, and (ii) return the impact plate 420 to its original position or to a ready position, i.e., so that the flexible elastomeric membrane 404 can perform work for a subsequent cycle. It will be understood that the shape, thickness, and volume occupied by the flexible elastomeric membrane 404 is merely exemplary and other configurations are contemplated.

In the described embodiment, the flexible elastomeric membrane 404 may be fabricated from a rubber material, including natural rubber, fluoroelastomer, fluorosilione, silicone, EPDM, butyl rubber, nitrite and the like. The flexible elastomeric membrane 404 may have a shear modulus greater than about $4.35 \times 10^5$ psi, a bulk modulus greater than about $2.2 \times 10^5$ psi, a maximum elongation greater than about 100% from an original size/length, and a durometer of between about between about thirty (30) to about seventy (70) on a Shore A hardness scale.

As previously mentioned, the flexible elastomeric membrane 404 defines a compliant accumulator cavity 442 which contains a specific volume of a viscous fluid 450 therein. The viscosity of the fluid is tied/related to the size of the damping orifice 430 and the desired damping effect produced by the shock absorbing apparatus 400. For the requirements of the present shock absorbing apparatus 400, the viscosity of the fluid is greater than about twenty centipoise (20 cP).

The flexible elastomeric membrane 404, furthermore, occupies a volume sufficient to envelop, circumscribe, or enclose the compression assembly 406 which, as mentioned supra, includes the reciprocating input member or piston 410, the piston guide 412 and the valve mechanism 414. More specifically, the compression assembly 406 is disposed between the stationary mounting plate 416 and the moving impact plate 420 to pump or move viscous fluid 450 through the damping orifice 430 in response to transmitted impact or shock loads S. Furthermore, the compression assembly 406 is responsive to: (i) the deformation of the flexible elastomeric membrane 404, (ii) the displacement of the impact plate 420 relative to the mounting plate 416, (iii) and the energy storage capacity of the flexible elastomeric membrane 404 to store at least a portion of the energy of the impact load S. With respect to the latter, it will be appreciated that the flexible elastomeric membrane 404 converts kinetic energy into potential energy for the purpose of returning the elastomeric membrane 404 to its original shape/size while, at the same time, returning the impact plate 420 to its original position. This, in turn, prepares or readies the shock absorbing apparatus 400 for another work cycle. In the described embodiment, the stationary guide 412 may include a shock tube 422 having a first end 424 sealably affixed to the mounting plate 416 by a base plate 418 which connects the shock tube 422 to the mounting plate 416. More specifically and according to this embodiment, the first end 424 of the shock tube 422 is welded, bonded or fused to the base plate 418 such that the elongate axis of the shock tube 422 is orthogonal to the base plate 418 and parallel to the direction of the transmitted shock load S. Alternatively, the shock tube 422 and first end 424 could be machined from the same piece.

In the illustrated embodiment, the base plate 418 may be riveted to the mounting plate 416 such that an edge of the flexible elastomeric membrane 404, i.e., the second end thereof, is captured between the mounting and base plates 416, 418. More specifically and according to this specific embodiment, a plurality of equiangularly-spaced rivets 428 are disposed about a mounting hole aperture 432 to sealably mount the base plate 418 to the mounting plate 416. In FIG. 7, the mounting plate 416 may include a female-threaded sleeve 436 projecting traversely from the underside of the mounting plate 416. In this embodiment, the base plate 418 includes a female-threaded sleeve 438 engaging the male-threaded sleeve 436 and a sealing O-ring (not shown) interposing the male and female-threaded sleeves 436, 438. The sealing O-ring may be captured in an annular groove machined or formed in one of the male and/or female-threaded sleeves 436, 438.

Each mounting and base plate 416, 418 according to this embodiment is formed as a substantially planar section made from a suitable metal, plastic or fiber-reinforced composite material, provided each of the plates provide structural stiffness and support. In at least one embodiment, the mounting and base plates 416, 418 may be fabricated from an injection molded plastic. While the mounting and base plates 416, 418 are depicted as separate elements to facilitate assembly, it will be appreciated that the plates 416, 418 may be integrated. For example, the mounting plate 416 may directly mount to the shock tube 422, thereby eliminating the requirement for a separate base plate 418.

In FIGS. 6-7, the first end 424 of the shock tube 422 seals to the base plate 418 and defines the compression cavity 446, when disposed in combination with the reciprocating piston 410. The second end 426 of the shock tube 422 is open to receive at least a portion of the reciprocating piston 410. Furthermore, the shock tube 422 includes a wall structure 434 defining a constant cross-section internal surface 436 for slideably engaging the reciprocating piston 410. The damping orifice 430 may extend through the wall structure 434 proximal the first end 424 of the shock tube 422, i.e., near the base plate 418, and fluidically connects the accumulator and compression cavities 442, 446. While several orifices 430 are illustrated in this embodiment, it is contemplated that a single orifice 430 may be employed depending upon the desired amount of load damping. Furthermore, while the damping orifice 430 is shown extending through the wall structure 434 of the shock tube 422, it will be appreciated that the orifice 430 may be axially disposed through the piston 410 provided that: (i) the valve mechanism 414 closes in response to a compressive stroke acting on the compression cavity, (ii) opens in response to a stroke separating the reciprocating piston 410 and the stationary piston guide, and (iii) fluidically connects the accumulator and compression cavities 442, 446 of the shock absorbing apparatus 400.

The reciprocating piston 410: (i) sits in the open second end 426 of the shock tube 422, (ii) connects to the underside of the impact plate 420 and (iii) reciprocates relative to the shock tube 422 in response to displacement of the impact plate 420. In the illustrated embodiment, the piston 410 is shown as being integrated with the impact plate 420, though, it should be appreciated that the reciprocating piston 410 may be connected to the impact plate 420 by a separate linkage, or other axial input member (not shown). In the described embodiment, the reciprocating piston 410 may include a piston ring 454 between the periphery of the piston 410 and the wall surface of the shock tube 422.

In FIGS. 6 and 7, the valve mechanism 414 includes a check valve 456 disposed in the flow path provided by the conduit 408. More specifically, the check valve 456 inhibits the flow of the viscous fluid 450 from the compression to the accumulator cavities 446, 442 when a first pressure differential develops in the compression cavity 446. Furthermore, the check valve 456 facilitates the flow of the viscous fluid 450 from the accumulator to the compression cavities 442, 446 when a second pressure differential develops in the compression cavity 446 relative to the accumulator cavity 442. The first pressure differential developed between the accumulator and compression cavities 442, 446 is characterized by a higher pressure in the compression cavity 446 such that fluid flows from the compression cavity 446, through the damping orifice 430, to the accumulator cavity 442. The valve mechanism 414 inhibits flow through the conduit 408 when the first pressure differential is developed. The second pressure differential is directionally reversed from the first pressure differential and is characterized by a higher pressure in the accumulator cavity 442 such that fluid flows from the accumulator cavity 442, through the conduit 408, to the compression cavity 446. The valve mechanism 414 facilitates flow through the conduit 408 when the second pressure differential is developed. Additionally, flow through the conduit 408 may be augmented by a secondary flow, albeit at a far lower flow rate, through the damping orifice 430. In the described embodiment, the valve mechanism 414 is disposed in combination with the reciprocating piston 410, though any of a variety of flow paths may be created between the cavities 442, 446 to prevent and facilitate flow therebetween.

Figure 8:
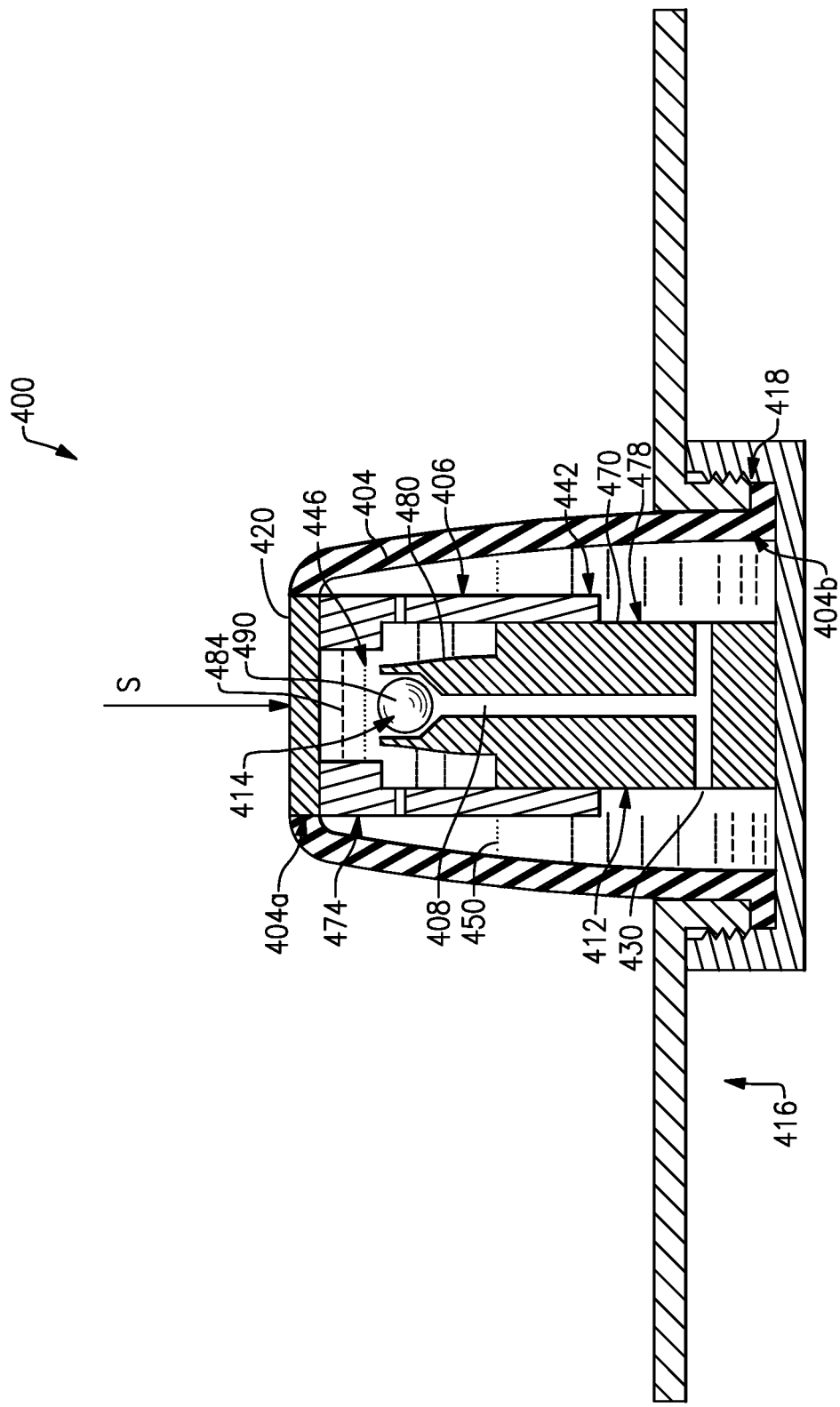
FIG. 8 is a sectioned view of a shock absorbing apparatus according to another embodiment, including a compression assembly having a reciprocating piston telescopically mounting to a stationary piston guide.

In another embodiment depicted in FIG. 8, the stationary guide 412 comprises a piston guide or strut 470 mounting to, and projecting orthogonally from, the base plate 418 and an external reciprocating piston 474. Furthermore, the piston guide or strut 470 is aligned with the impact shock load S acting on the impact plate 420. In the described embodiment, the strut 470 is tubular, i.e., having a constant, external, cross-sectional shape along its length, and is cylindrical. Notwithstanding the illustrated embodiment, the piston guide 470 may have any of a variety of cross-sectional shapes including rectangular, square, triangular, hexagonal, or elliptical, etc. The only requirement is that the reciprocating piston 474 slide freely over the external surface of the piston guide 470.

The first pressure differential is developed by a combination of: (i) the relative axial movement between the external piston 474 and the underlying strut 470, and (ii) a tapered pin 480 projecting upwardly from the strut 470 into a selectively-shaped internal chamber 484 of the compression cavity 446. With respect to the latter, the tapered pin 480 augments the change in volume within the compression cavity 446 as the piston 474 reciprocates axially on the external guide surface 478 of the strut 470.

Similar to the previous embodiments, a check valve 490 is disposed in the flow path provided by the conduit 408. More specifically, the check valve 490: (i) inhibits the flow of the viscous fluid 450 from the compression to the accumulator cavities 446, 442 when first pressure differential develops in the compression cavity 446, and (ii) facilitates the flow of the viscous fluid 450 from the accumulator to the compression cavities 446, 442 when a second pressure differential develops in the compression cavity 446 relative to the accumulator cavity 442. In the described embodiment, the valve mechanism 414 is disposed in combination with the piston strut 470, although one may contemplate any of a variety of flow paths, including flow paths through the reciprocating piston 474 to prevent and facilitate flow between the accumulator and compression cavities 442, 446.

Figure 9:
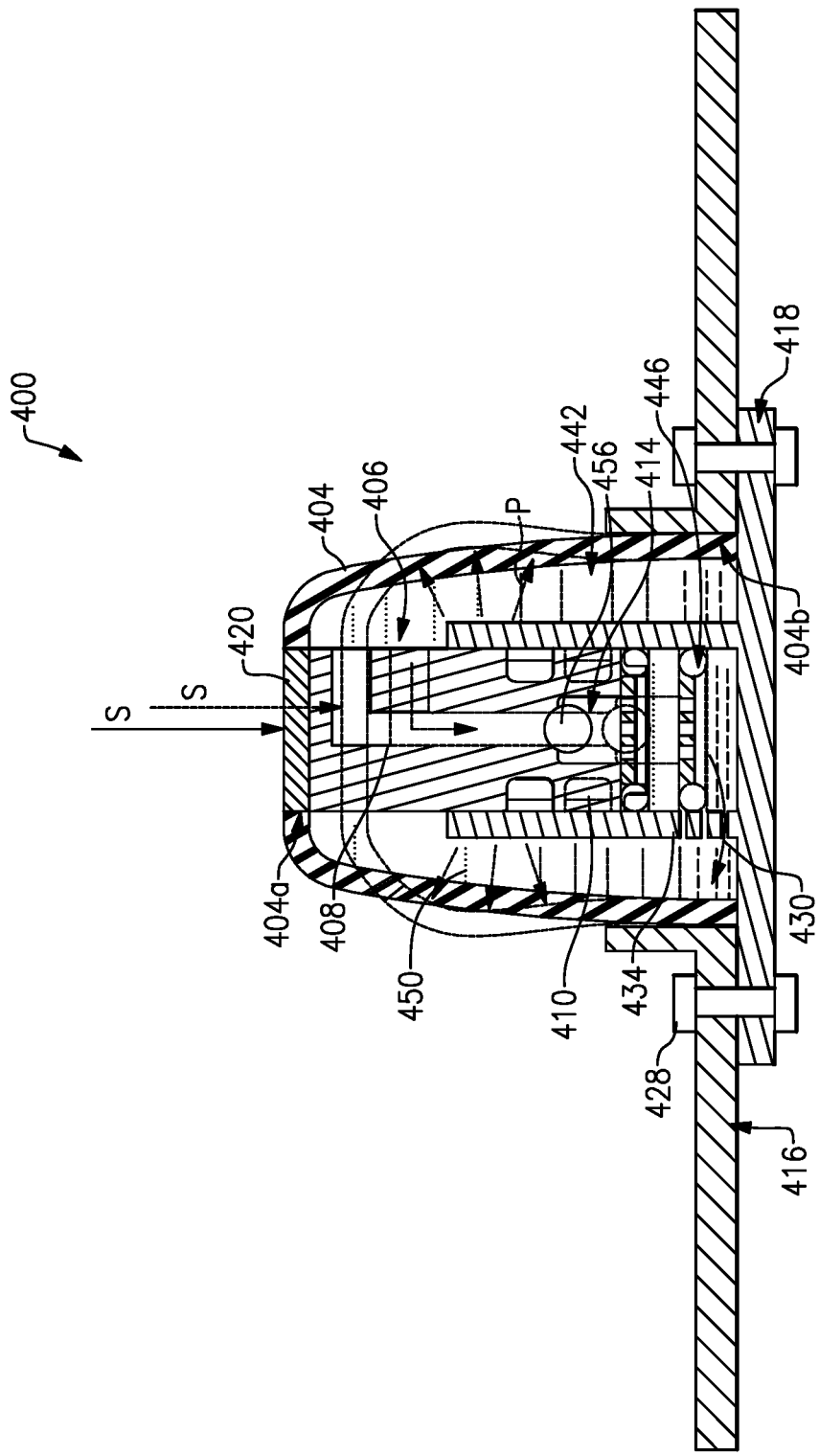
FIG. 9 is a sectioned side view of the shock absorbing apparatus of FIG. 6 shown in two modes or positions, i.e., an initial position, (shown in solid lines) and a displaced position (shown in dashed lines) to depict the damping and energy storing modes of the shock absorbing apparatus.

In operation, and referring FIG. 9, the shock absorbing apparatus 400 can be disposed between die portions of a blow molding apparatus (not shown). As attached, the impact plate 420 is aligned in relation to a movable die portion (not shown) of the molding apparatus. As the die is closed, it engages the impact plate 420 as depicted by arrow S, generating a compressive load against the flexible elastomeric membrane 404. The compressive impact load S causes an inward deformation of the elastomeric membrane 404 toward the mounting plate 416.

The deformation of the flexible elastomeric membrane 404 and motion of the impact plate 420 displaces the compression assembly 406, i.e., the reciprocating piston 410 within the stationary guide 412. The motion of the reciprocating piston 410 causes the check valve 456 to close thereby preventing the reverse or back-flow of viscous fluid 450 from the compression cavity 446 into the accumulator cavity 442 via the conduit 408. Rather, the displacement of the piston 410 forces the contained hydraulic fluid 450 through the damping orifice 430. The shearing of the contained hydraulic fluid 450 through the damping orifice 430, and the flexure of the elastomeric flexible membrane 404 act to convert the energy of the applied impact load S into heat which is, in turn, dissipated into the environment.

At the same time, the flow of the viscous fluid 450 from the compression cavity 446 to the accumulator cavity 442 builds pressure therein in the direction of the arrows P. The flexible membrane 404 bows outwardly (exaggerated as dashed lines to show the expansion of the membrane 404) under the compression developed as the first pressure differential develops in the compression assembly 406. As such, at least a portion of the kinetic energy is stored as potential energy in the stressed elastomeric material. The build-up of pressure from the compression assembly 406 may be viewed as analogous to the expansion of an internally pressurized balloon.

At the bottom of the piston stroke, the impact load ceases and the pressure differential reverses direction, i.e., the pressure developed in the accumulator cavity 442 exceeds the pressure in the compression cavity 446. This reversal causes the viscous fluid 450 to flow through the conduit 408 from the accumulator to the compression cavities 446, 442. That is, the check valve 456 opens to allow flow to travel in the opposite direction. As mentioned earlier, fluid flow may be augmented by flow through the damping orifice 430, though, to a far lesser extent. As a consequence, the hydraulic fluid 450 is restored to the compression cavity 446 and the shock absorber apparatus 400 is prepared/readied for another work cycle.

Inasmuch as the entire compression assembly 406 is disposed within the accumulator cavity 442, all moving parts and sliding surfaces of the compression assembly 406, including valves, sliding seals, etc., are contained within the one of the fluid cavities 442, 446. Consequently, the requirement for costly high tolerance, dynamic seals are eliminated. Furthermore, inasmuch as the flexible membrane 404 also functions in the capacity of an energy storage device, the requirement for energy storing springs, or other energy converting devices may be eliminated.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

| Reference Numerals/Parts List | |
|---|---|
| 100 | shock absorbing apparatus |
| 106 | piston assembly |
| 110 | piston head |
| 114 | piston rod |
| 120 | cylinder |
| 124 | cavity |
| 128 | biased spring |
| 130 | orifice |
| 136 | accumulator |
| 140 | frictional seal |
| 200 | shock absorbing apparatus |
| 204 | housing, flexible |
| 206 | housing portion |
| 208 | housing portion |
| 210 | elastomeric section |
| 212 | orifice plate |
| 216 | mounting or support plates |
| 217 | outer periphery, elastomeric section |
| 219 | inner periphery, elastomeric section |
| 220 | striker plates |
| 224 | opening, striker plate |
| 226 | annular groove |
| 228 | fastener |
| 229 | O-ring |
| 230 | mounting holes |
| 234 | rings |
| 237 | grooves |
| 238 | orifice |
| 240 | interior, hollow |
| 242 | variable geometry fluidic chamber |
| 246 | fixed geometry fluidic chamber |
| 250 | hydraulic fluid |
| 252 | pin members |
| 254 | distal end, pin member |
| 256 | proximal end, pin member |
| 258 | proximal opening, pin member |
| 260 | proximal end, pin member |
| 266 | spring, biasing |
| 284 | arrow |
| 288 | arrow |
| 300 | shock absorbing apparatus |
| 304 | housing |
| 310 | elastomeric section |
| 312 | orifice plate |
| 316 | support or mounting plates |
| 320 | striker plate |
| 328 | fastener, striker plate |
| 340 | hollow interior |
| 342 | fluidic chamber |
| 346 | fluidic chamber |
| 390 | structure (test fixture) |
| 394 | fasteners |
| 396 | arrow, load |
| 400 | shock absorbing apparatus |
| 404 | flexible elastomeric membrane, |
| 404a | first end (flexible membrane) |
| 404b | second end (flexible membrane) |
| 406 | compression assembly |
| 408 | conduit |
| 410 | internal reciprocating piston |
| 412 | stationary guide |
| 414 | valve mechanism |
| 416 | mounting plate |
| 418 | base plate |
| 420 | impact plate |
| 422 | shock tube |
| 414 | shock tube (first end) |
| 426 | shock tube (second end) |
| 428 | rivets |

-continued

| Reference Numerals/Parts List | |
|---|---|
| 430 | damping orifice |
| 432 | mounting hole aperture (M. Plate) |
| 434 | wall structure (shock tube) |
| 436 | threaded sleeve M. Plate (male) |
| 438 | threaded sleeve B. Plate (female) |
| 442 | accumulator cavity |
| 446 | compression cavity |
| 450 | viscous fluid |
| 454 | piston ring |
| 456 | check valve (piston) |
| 470 | piston strut or guide |
| 474 | external reciprocating piston |
| 478 | CCS external guide surface (strut) |
| 480 | piston ring (between piston & tube) |
| 484 | variable geometry cavity |
| 490 | check valve (strut) |

It will be readily apparent that other variations and modifications can be understood from the discussion of the inventive concepts that have been discussed herein, including the appended claims.

What is claimed is:

1. A shock absorbing apparatus comprising:
a flexible housing substantially formed from a pair of identical fluid-impermeable elastomeric housing sections defining an interior,
a plate having a portion disposed within the interior of the housing, said portion having at least one orifice, the plate separating adjacent symmetric chambers within the interior of the flexible housing containing a hydraulic fluid that are fluidically connected by the at least one orifice, the plate further having a portion extending outside of the flexible housing;
a pair of mounting plates for connecting the flexible housing to a structure that is under load in which transmitted loads from the structure cause the contained hydraulic fluid to move under pressure through the at least one orifice to provide shock absorption, wherein each mounting plate is attached to: i) opposing ends of one of the elastomeric housing sections of the flexible housing, and ii) opposing sides of the portion of the plate having the at least one orifice extending outside of the flexible housing; and
one or more pin members disposed within the interior of the housing, each said pin member having a tapered configuration for engaging the at least one orifice in order to define a variable orifice diameter, wherein each of the identical fluid-impermeable elastomeric housing sections further includes a striker plate aligned with the at least one orifice to enable loads to be transmitted to either side of the flexible housing and in which each said pin member is disposed between the striker plate and the plate having the at least one orifice, each said pin member being coupled to a fastener extending through the striker plate.

2. The shock absorbing apparatus of claim 1, in which the outer ends of each of the two elastomeric housing sections of the flexible housing are bonded to one of the mounting plates.

3. The shock absorbing apparatus of claim 1, in which the at least one striker plate is made from a non-metallic, abrasion resistant material.

4. The shock absorbing apparatus of claim 1, including at least one biasing spring disposed within the interior of the housing.

5. The shock absorbing apparatus of claim 4, wherein the at least one biasing spring comprises a biasing spring disposed within each adjacent chamber on either side of the plate having the at least one orifice.

6. The shock absorbing apparatus of claim 1, comprising two said pin members, each pin member being disposed on opposing sides of the plate having the at least one orifice and in axial relation to one another.

7. The shock absorbing apparatus of claim 1, in which the two mounting plates and the plate having the orifice include aligned mounting holes that enable attachment of the flexible housing to the structure under load.

8. A shock absorbing apparatus comprising:
a flexible housing having an interior and comprising:
    a first housing portion comprising a fluid impermeable elastomeric section having outer ends bonded to a first base plate and a first striker plate; and
    a second housing portion comprising a fluid impermeable elastomeric section having outer ends bonded to a second base plate and a second striker plate;
an orifice plate disposed between the first and second housing sections that is attached to the first and second base plates of the first and second housing portions, the orifice plate having at least one orifice in which the first and second housing portions are identical and combine to form symmetric interior fluidic chambers separated by the orifice plate, wherein impact loads to at least one of the first and second striker plates causes compression of at least one of the first and second housing portions and movement of the contained hydraulic fluid between the defined fluidic chambers through the at least one orifice in order to effect shock absorption relative to a connected structure; and
at least one pin member axially supported between one of the first and second striker plates and the plate having the at least one orifice and coupled to a fastener extending through the said one striker plate, the at least one pin member having a tapered configuration configured to create a variable orifice diameter.

9. The shock absorbing apparatus of claim 8, including a pair of biasing springs in axial alignment with the striker plates and the at least one orifice.

10. The shock absorbing apparatus of claim 8, comprising two said pin members, each said pin member being disposed on opposite sides of the orifice plate.

11. The shock absorbing apparatus of claim 10, including biasing springs disposed over each of the pin members.

* * * * *